United States Patent [19]

Baars

[11] Patent Number: 4,969,787
[45] Date of Patent: Nov. 13, 1990

[54] DEVICE FOR SEALING AN APERTURE IN A WALL WITH A FOAMED RESIN

[75] Inventor: Jan Baars, Montfoort, Netherlands

[73] Assignee: Chemische Industrie Filoform B.V., Netherlands

[21] Appl. No.: 401,744

[22] Filed: Sep. 1, 1989

[30] Foreign Application Priority Data

Sep. 20, 1988 [NL] Netherlands ................... 8802324

[51] Int. Cl.$^5$ ..................... F16B 39/02; E04B 1/38
[52] U.S. Cl. ..................... 411/82; 411/508; 411/913; 52/515; 52/707
[58] Field of Search ............... 411/341, 342, 446, 450, 411/456, 478, 483, 107, 508, 509, 913, 922, 82; 52/404, 514, 515, 704, 707, 708

[56] References Cited

U.S. PATENT DOCUMENTS

| | | | |
|---|---|---|---|
| 927,367 | 7/1909 | Marshall | 411/456 X |
| 1,312,056 | 8/1919 | Shaw | 411/456 X |
| 1,370,319 | 3/1921 | Kennedy | 411/341 |
| 2,392,179 | 1/1946 | Paley et al. | 411/922 X |
| 3,168,850 | 2/1965 | Tennigan | 411/342 |
| 4,678,385 | 7/1987 | Ollivier et al. | 411/456 |

*Primary Examiner*—Neill R. Wilson
*Attorney, Agent, or Firm*—Griffin, Branigan & Butler

[57] ABSTRACT

A device for attaching a plate or cap over an opening, comprising a rod or wire extending from the front through the plate or cap. On the end of the rod or wire extending into the opening, there is provided a spring clamp whose end remote from the rod or wire has a sharp point. The plate or cap has a closeable opening therein for introducing a foamable resin thereinto, which foamable resin forms a foam in the plate or cap and in the opening and, thus, seals the opening.

9 Claims, 3 Drawing Sheets

DEVICE FOR SEALING AN APERTURE IN A WALL WITH A FOAMED RESIN

This invention relates to a device for attaching a plate or cap over an opening.

In passing a cable through an opening in a wall, use is made of a cap for covering the opening around the cable, said cap being provided with an opening for passing the cable, while the peripheral rim is screwed onto the wall. The cap further contains an opening for introducing liquid synthetic resin which, after its introduction, will foam so that a part of the expanding synthetic resin penetrates into the opening, thereby sealing it. A device of this type is known from Dutch Pat. application No. 8601145, corresponding with European Pat. application No. 86 201 856.1 (publication No. 0 244 514) both of which correspond to U.S. Pat. No. 4,751,031. Such a method of application requires the use of a drilling machine for providing openings for attachment of the screws. The use of a drilling machine requires the provision of a power supply. Another problem in this respect is the consistency of the material of which the wall is made. In certain cases, this material is such that crumbling or chipping takes place, so that the cap fails to become properly secured and may get detached from the wall when stresses occur due to the expansion of the synthetic resin, as a result of which the foaming material flows away laterally instead of flowing into the opening to be sealed.

It is an object of the present invention to remove this drawback.

To that effect, the device of the above described type is characterized by a rod or wire extending from the front through the plate or cap, and by a spring clamp fitted on the end of said rod or wire extending into the opening, the end of said spring clamp remote from the wire or rod having a sharp point.

As used herein, and in the appended claims, the term "spring clamp" means a resiliently clamping element or clip.

One end of the rod or wire may have a bent portion, while the other end may be provided with two wirelike portions oriented at an acute angle towards said one end. In that embodiment the angularly arranged portions can be connected to the rod or wire by means of welding, soldering or the like. Another possibility is for the rod or wire or the two portions of the spring clamp to be bent from a single wire.

In a further elaboration of the present invention, the end of the spring clamp connected to the rod is parallel to, or at a small angle to, the axis of the rod, while the opposite end terminates in (a) sharp point(s) or edge(s) at least partly normal to the axis of the rod.

For facilitating the attachment of the threaded rod the front end of this rod can be provided with threading and with a threaded bush extending through the opening of the plate.

A simple construction is obtained when the spring clamp is fixedly connected to the threaded rod. This can be effected by welding or soldering the spring clamp onto the threaded rod. Another possibility, however, is for the spring clamp, at the end connected to the threaded rod, to be provided with a threaded bush affixed thereto and arranged for cooperation with the threaded rod.

In a further elaboration of the present invention, the spring clamp can be designed in such a manner that a cable can extend therealong in mounted condition. To that end, the end remote from the threaded rod can be cup-shaped or curved and, in development, fishtail-shaped.

Some embodiments of the device according to the invention for attaching a cap over an opening will now be described, by way of example, with reference to the accompanying drawings, in which:

FIG. 1 a diagrammatic side view of the device for attaching a cap over an opening in a wall;

Figure 1:
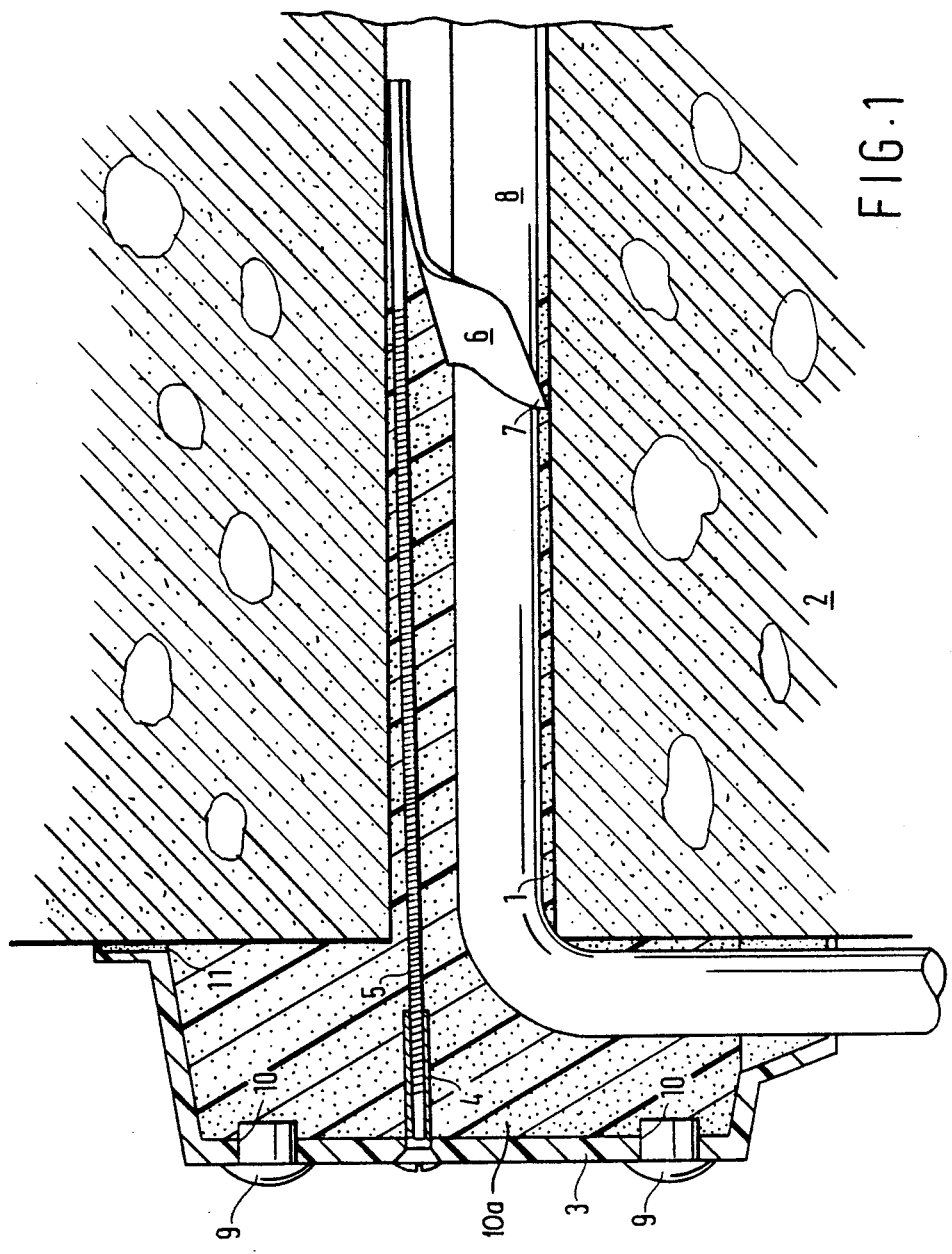
Figure 2:
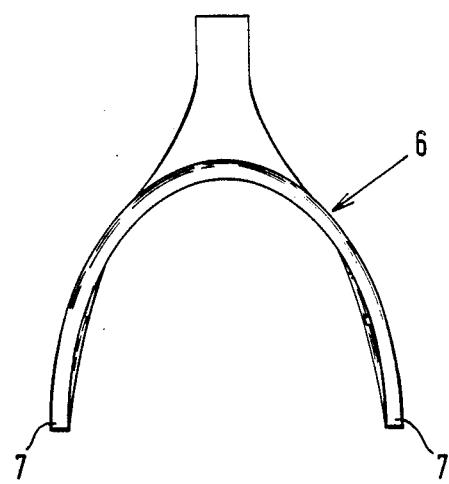
FIG. 2 is an elevational view taken on the line II—II in FIG. 1, with omission of the wall.
Figure 3:
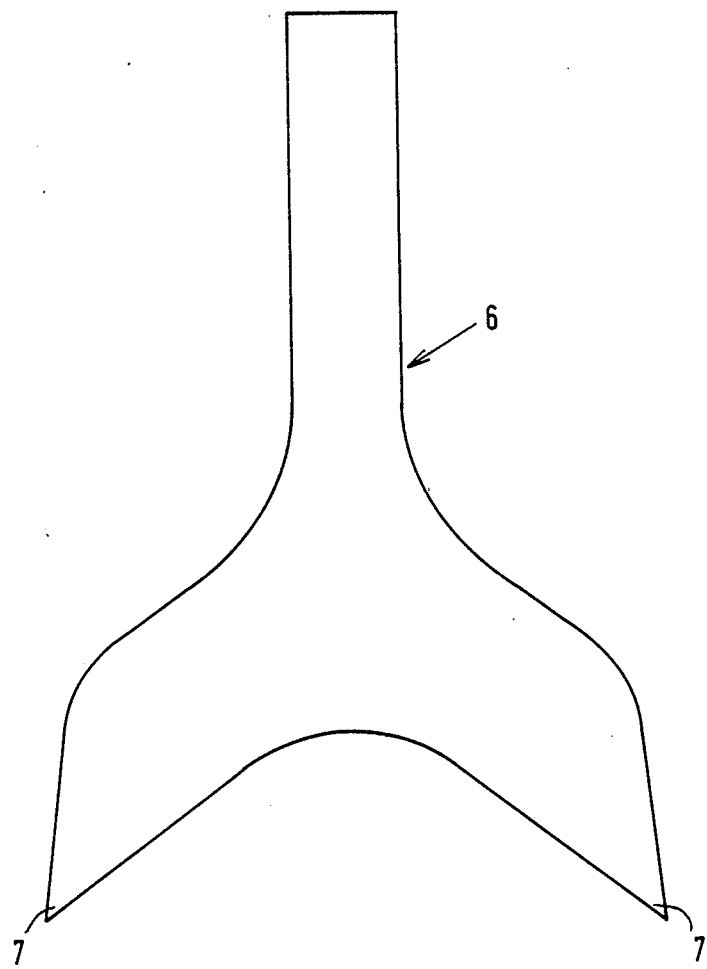
FIG. 3 shows a development of the spring clamp according to FIGS. 1 and 2.
Figure 4:
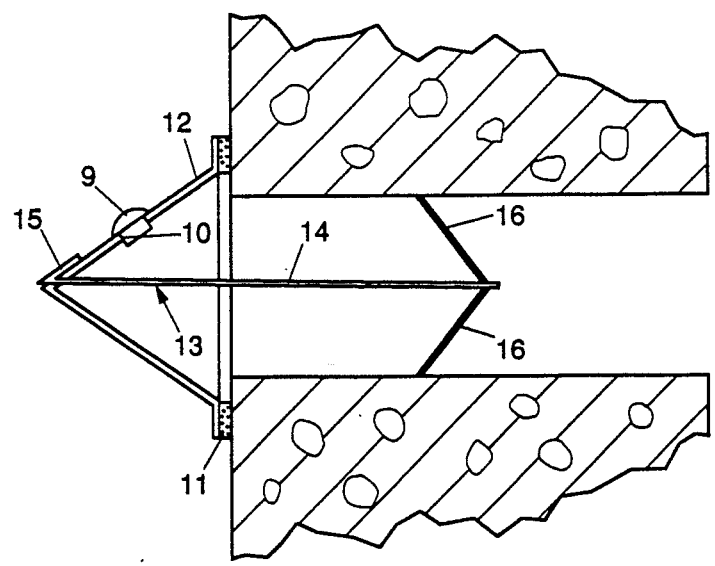
Figure 5:
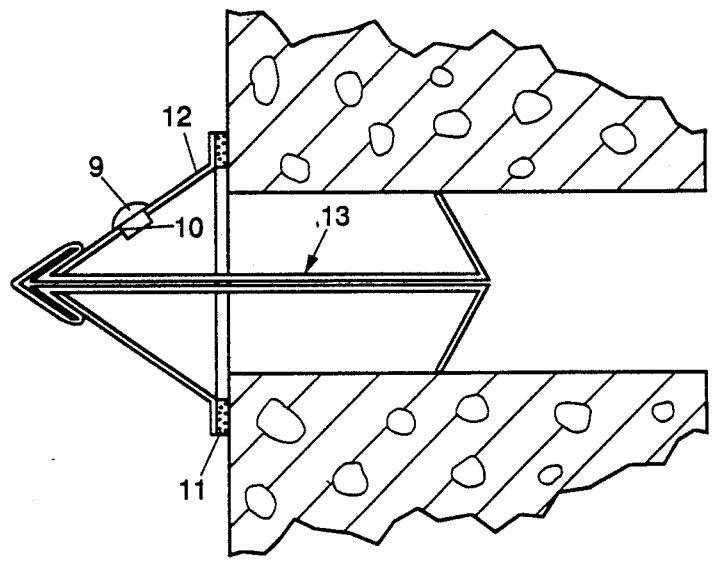

FIGS. 4 and 5 elevational views similar to FIG. 1, showing two other embodiments of the device according to the present invention.

As shown in the drawings, an opening 1 in a wall 2 is covered by a cap 3. The attachment of the cap takes place by tightening a threaded bush 4 over one end of a threaded rod 5, at the opposite end of which there is provided a spring clamp 6 by means of welding. Spring clamp 6, as shown, is curved, and fishtail-shaped, with the free ends of the fishtail-shaped portion terminating in sharp points 7, which, when bush 4 is tightened, readily sticks to the wall of opening 2 accommodating the device.

This arrangement enables a simple yet effective locking of the cap relative to the wall. By giving the spring clamp a curved and, in development, a fishtail configuration, a wire or cable 8 can be easily passed therealong, which wire or cable will not be damaged when the threaded bush is tightened.

The cap 3 is provided in a known manner with a resilient sealing ring 11 for an effective sealing relative to the wall, while furthermore there are provided openings 10 to be shut off by filler plugs 9, through which openings liquid synthetic resin can be supplied and subsequently foamed, as shown by 10a.

In the embodiments shown in FIGS. 4 and 5, a conical cap 12 is retained over an opening 1 in a wall 2 by means of a wire or rod 13. Disposed between cap 12 and wall 2 is a resilient sealing ring 11. Wire or rod 13 essentially consists of a straight wire portion 14 having a bent end portion 15 extending through an opening, not shown, in the top of the conical cap 12. On the opposite end portion of wire 14, the latter is provided with two welded-on wire members 16. Members 16 are connected to wire 14 in such a manner that, in the mounted condition, they resiliently abut on the wall of opening 1.

The construction described with reference to FIG. 4 requires a rod or wire with spring clamp the manufacture of which requires a number of operations, including a welding or soldering operation. In the embodiment shown in FIG. 5, this drawback is removed by a wire 13 bent from a single piece, whose shape will be self-evident in view of the above and which will therefore not be further explained.

In view of the above, it will be clear that a great many modifications are possible within the scope of the present invention.

I claim:

1. In a device for sealing an aperture in a wall, wherein the aperture is of substantially greater peripheral size than that of a cable or the like passing therethrough and the aperture has an elongated inner wall portion, wherein a hollow cap having a peripheral size greater than the peripheral size of the aperture is attached to a wall around said aperture, wherein the cable or the like passes through an opening in the hollow cap, and wherein the hollow cap is sufficiently hollow that a foamable resin may be introduced thereinto through a sealable opening and allowed to foam so as to fill the hollow cap and at least partially fill the aperture whereby the said seal is formed, the improvement comprising a solid rod or wire of substantially less peripheral size than that of said aperture with one end portion thereof attached to a front portion of the hollow cap and the rod or wire extending through an opening in the hollow cap, into the aperture and terminating in an other end portion disposed along said elongated inner wall portion of the aperture, a resilient clamping member disposed near said other end portion and being of a peripheral size slightly larger than that of the aperture and being sprung so that the clamping member is resiliently urged by said inner wall portion inwardly and toward said aperture when being placed in the elongated inner wall portion, the clamping member being configured so as to provide a passage therethrough for said cable and having at least one sharpened point at an extremity thereof whereby the sharpened point will contact the elongated inner wall portion and resist displacement of said hollow cap.

2. A device as claimed in claim 1, wherein the said one end portion of the rod or wire has a bent portion, while the said other end portion is provided with two wirelike portions connected to the rod or wire and arranged at an acute angle and oriented towards said one end portion so as to form a spring clamp.

3. A device as claimed in claim 2, wherein the angularly arranged wirelike portions are connected to the rod or wire by means of welding, soldering or the like.

4. A device as claimed in claim 2, wherein the said two wirelike portions of the spring clamp are bent from a single wire.

5. A device as claimed in claim 2, wherein the rod or wire is at least partly threaded, one end of the spring clamp connected to the rod or wire is parallel to the axis of said rod or wire, while an opposite end of said clamp terminates in a sharp point or edge which is substantially normal to the axis of the rod.

6. A device as claimed in claim 5, wherein the said one end portion of the rod or wire is provided with threading and with a threaded bushing extending through the said opening in the hollow cap.

7. A device as claimed in claim 5, wherein the spring clamp is fixedly connected to the rod.

8. A device as claimed in claim 5, wherein the spring clamp, at the end connected to the threaded rod, is provided with a threaded bushing affixed thereto and adapted for cooperation with the threaded rod.

9. A device as claimed in claim 5, wherein the end of the clamp remote from the threaded rod has a curved and, in development, fishtail configuration.

* * * * *